United States Patent [19]

Mee et al.

[11] 4,234,150
[45] Nov. 18, 1980

[54] MECHANICAL ARM ASSEMBLY

[75] Inventors: Francis H. A. Mee, Aurora; Henry J. Taylor, Willowdale, both of Canada

[73] Assignee: Spar Aerospace Limited, Toronto, Canada

[21] Appl. No.: 9,378

[22] Filed: Feb. 2, 1979

[51] Int. Cl.³ .............................................. E04G 3/00
[52] U.S. Cl. .................................. 248/281.1; 248/324; 414/4
[58] Field of Search ................... 248/124, 286, 281.1, 248/279, 280.1, 278, 122, 324, 325; 414/4, 5

[56] References Cited

U.S. PATENT DOCUMENTS

| 134,793 | 1/1873 | Fenno | 248/283 |
|---|---|---|---|
| 256,583 | 4/1882 | Merrill | 248/281.1 |
| 717,121 | 12/1902 | Richardson | 248/281.1 |
| 871,400 | 11/1907 | Hall | 248/281.1 |
| 1,340,908 | 5/1920 | Pieper | 248/281.1 X |
| 2,996,805 | 8/1961 | Baker | 248/280.1 X |
| 3,073,343 | 1/1963 | Mowell et al. | 248/280.1 X |
| 3,160,379 | 12/1964 | Gardella | 248/124 |
| 3,362,432 | 1/1968 | Jameson | 248/280.1 X |
| 3,630,389 | 12/1971 | Schmidt | 414/4 |
| 4,156,512 | 5/1979 | Broinn | 248/281.1 X |

FOREIGN PATENT DOCUMENTS 936164 12/1955 Fed. Rep. of Germany ............ 248/278

Primary Examiner—J. Franklin Foss
Attorney, Agent, or Firm—Fetherstonhaugh & Co.

[57] ABSTRACT

An extensible articulated manipulator arm is described in which the distal end is movable in a straight line relative to the proximal end thereof. The articulated arm includes a first arm which incorporates a first parallelogram linkage and a second arm which includes a second parallelogram linkage, the adjacent ends of the parallelogram linkages are drivingly connected to one another whereby rotation of the first arm about the first end support alters the geometry of the first parallelogram linkage which in turn effects a corresponding alteration in the geometry of the second parallelogram linkage, thereby to cause movement of the distal end of the second arm in a straight line relative to the proximal end of the first arm.

15 Claims, 8 Drawing Figures

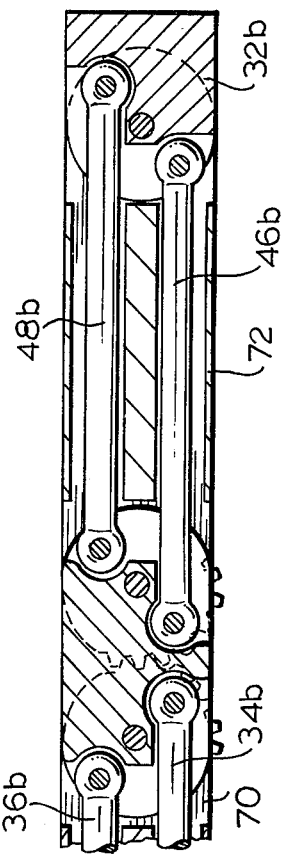
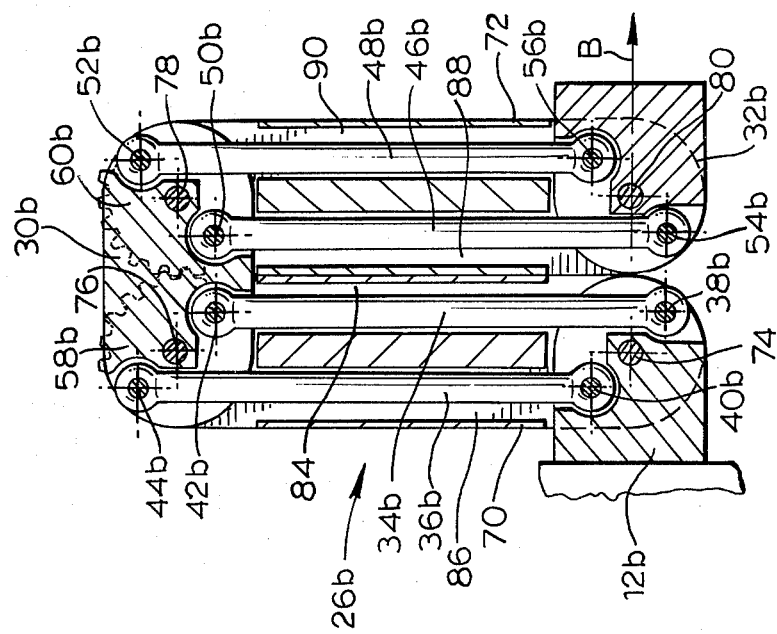

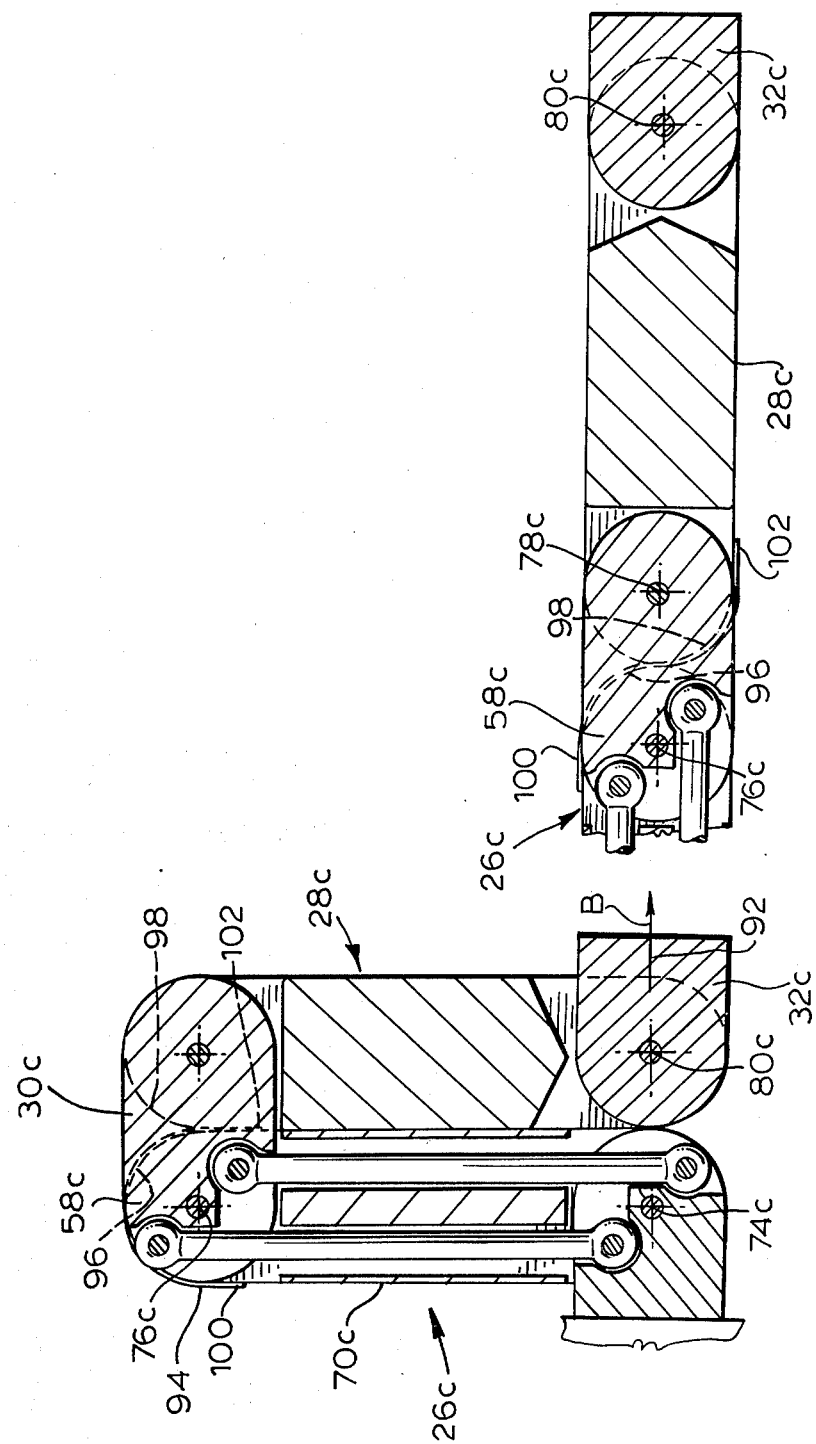

MECHANICAL ARM ASSEMBLY

This invention relates to manipulator arms. In particular, this invention relates to an articulated manipulator arm in which the distal end is movable in a straight line relative to the proximal end thereof.

Articulated manipulator arms are used in many fields to locate a tool or the like at the required location. Difficulty has been experienced in attempting to simplify the structure of an articulated arm to achieve linear movement of the distal end thereof in response to powering of the arm between an extend/retract configuration.

While it is desirable to provide an articulated manipulator arm which will have a substantial reach it is also important to ensure that when the arm is in the retracted configuration it assumes a complex configuration.

In many applications articulated manipulator arms are required to be constructed so as to reach around obstacles located in the path of direct extension and in many other applications it is necessary for the arm to operate in a restricted space.

The manipulator arm constructed in accordance with one or other of the various forms described hereinafter is capable of overcoming the difficulties of the prior art described above.

In one form the manipulator arm consists of a first arm and a second arm connected by an elbow member such that the distal end of the second arm is moved relative to the proximal end of the first arm in a straight line in response to extension or retraction of the arm resulting from bending about the elbow.

In a second form of the manipulator arm, a third arm has its proximal end mounted at the distal end of the second arm and a fourth arm is connected to the third arm by an elbow member so that the distal end of the fourth arm is movable in a straight line with respect to the proximal end of the third arm. The third and fourth arms are arranged to extend in a plane which is normal to the plane in which the first and second arms extend thus providing increased manoeuvrability of the distal end of the fourth manipulator arm.

SUMMARY OF INVENTION

According to one aspect of the present invention, a manipulator comprises a first arm having a proximal end and a distal end, a second arm having a proximal end and a distal end, an elbow member disposed between the distal end of said first arm and the proximal end of said second arm, said first arm comprising; a first end support member at the proximal end thereof, a first pair of linkage members of equal length, said first pair of linkage members consisting of a first and second link arm each having a proximal end pivotally mounted on said first end support member and a distal end pivotally mounted on said elbow member, said first and second link arms extending parallel to one another and cooperating with said first support end and said elbow member to form a first movable parallelogram linkage assembly, said second arm comprising, a second end support member at the distal end thereof, a second pair of linkage members of equal length, said second pair of linkage members consisting of third and fourth link arms each having a proximal end pivotally mounted on said elbow member and a distal end pivotally mounted on said second end support member, said third and fourth link arms extending parallel to one another and cooperating with said elbow member and said second end support member to form a second movable parallelogram linkage assembly, power transmission means drivingly interconnecting said first arm and said second arm at said elbow member whereby angular movement of said first arm relative to said elbow causes identical angular movement of said second arm relative to said elbow thereby causing the distal end of said second arm to move in a straight line path relative to said proximal end of said first arm as said remote manipulator is extended and retracted.

According to a further aspect of the present invention a manipulator comprises a first support structure forming a mounting interface, a vertically oriented elevator arm assembly comprising, a first elevator arm having a proximal end and a distal end, a second elevator arm having a proximal end and a distal end, a first elbow member disposed between the distal end of said first arm and the proximal end of said second arm, said first elevator arm comprising first and second link arms of equal length, said first and second link arms each having a proximal end pivotably mounted on said first support structure and a distal end pivotably mounted on said first elbow, said first and second link arms extending parallel to one another and cooperating with said first support structure and said elbow to form a first movable parallelogram linkage assembly, said second end support member at the distal end thereof, third and fourth link arms of equal length, said third and fourth link arms each having aproximal end, pivotably mounted on said first elbow and a distal end pivotably mounted on said second end support member, said third and fourth arms extending parallel to one another and cooperating with said first elbow member and said second end support member to form a second movable parallelogram linkage assembly, power transmission means drivingly interconnecting said first elevator arm and said second elevator arm at said first elbow member whereby angular movement of said first elevator arm relative to said first elbow causes identical angular movement of said second elevator arm relative to said first elbow member, elevator drive means drivingly connecting to a selected one of said first and second parallelogram linkage assemblies for effecting angular movement of a selected one of said link arms about its pivotal connection thereby to effect angular movement of said selected linkage assembly and thereby extend and retract said vertically oriented elevator arm assembly to move the distal end of the second elevator arm vertically in a straight line path relative to the proximal end of the first arm in response to activation of said elevator drive means, a horizontally oriented extensible arm assembly comprising a first horizontal arm having a proximal end and a distal end, a second horizontal arm having a proximal end and a distal end, a second elbow member disposed between the distal end of said first horizontal arm and the proximal end of said second horizontal arm, said first horizontal arm comprising fifth and sixth link arms of equal length, said fifth and sixth link arms each having a proximal end pivotably mounted on said second support end structure and a distal end pivotably mounted on said second elbow, said fifth and sixth link arms extending parallel to one another and cooperating with said second support structure and said second elbow to form a third movable parallelogram linkage assembly, said second horizontal arm comprising a third end support member at the distal end thereof, seventh and eighth link arms of equal length, said seventh and eighth link arms each having a proximal end pivotably mounted on said second elbow and a distal end pivotably mounted on said third end support member, said seventh and eighth link arms extending parallel to one another and cooperating with said second elbow member and said third end support member to form a fourth movable parallelogram linkage assembly, second power transmission means drivingly interconnecting said first horizontal arm and said second horizontal arm at said second elbow member whereby angular movement of said first horizontal arm relative to said second elbow member causes identical angular movement of said second horizontal arm relative to said second elbow member, extend/retract drive means drivingly connected to a selected one of said third and fourth linkage assemblies for effecting angular movement of one of its link arms about its pivotal connection thereby to effect angular movement of said selected linkage assembly which translates through the fourth and fifth parallelogram linkage assemblies and the second power transmission means into extension or retraction of said horizontal arm assembly.

The invention will be more clearly understood after reference to the following detailed specification read in conjunction with the drawings wherein, FIG. 1 is a pictorial view of a manipulator arm constructed in accordance with an embodiment of the present invention and arranged in a compact storage configuration;

FIG. 5 is a sectional side view of the manipulator arm constructed in accordance with an embodiment of the present invention;

FIG. 5a is a sectional side view of a portion of the arm of FIG. 5 showing the arm in the extended configuration;

FIG. 6 is a sectional side view similar to FIG. 5 illustrating a further embodiment of the present invention; and FIG. 6a is a side view of a portion of the arm of FIG. 6 in the extended position.

Figure 2:
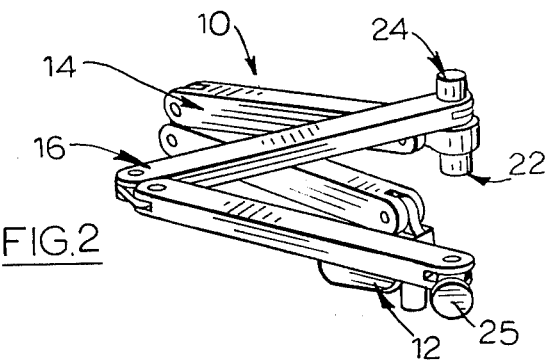
FIG. 2 is a view of the manipulator arm of FIG. 1 in a partially extended configuration.

With reference to the drawings, the reference numeral 10 refers generally to a mechanical arm assembly. The mechanical arm assembly includes a support 12 which is adapted to form a mounting interface with a support structure (not shown), an elevator arm assembly 14 and a horizontal arm assembly 16. An elevator drive mechanism 18 (FIG. 2) is mounted on the support 12, an azimuth drive motor 22 and an extend/retract motor 24 are mounted at the interface between the elevator arm assembly 14 and the horizontal arm assembly 16. A further interface member 25 is located at the distal end of the horizontal arm assembly 16.

The primary function of the elevator arm assembly 14 is to raise and lower the horizontal arm assembly 16 and the primary function of the horizontal arm is to move the interface member 25 in a horizontal plane.

Figure 3:
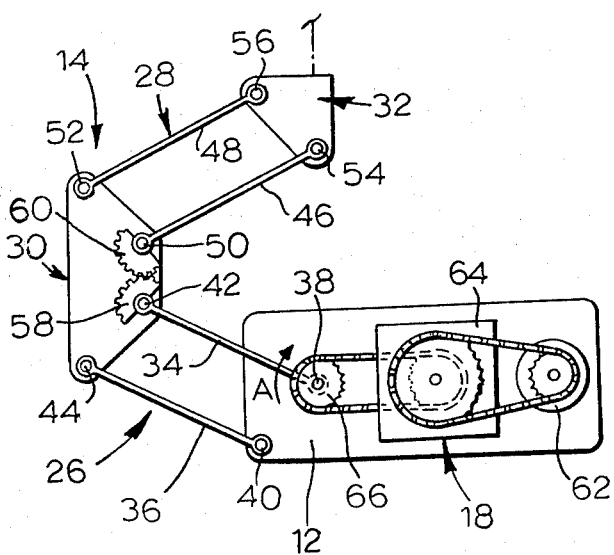
FIG. 3 is a diagrammatic side view of a two section manipulator arm.

With reference to FIG. 3 of the drawings, it will be seen that the elevator arm assembly 14 has a first elevator arm 26, a second elevator arm 28, a first elbow member 30, a second support bracket 32. The first elevator arm 26 is a composite member which includes a first link arm 34 and a second link arm 36, the proximal ends of the link arms 34 and 36 being pivotably mounted on the first support member 12 for rotation about horizontally oriented axes 38 and 40 respectively, the distal ends of the arms 34 and 36 being pivotably mounted on the first elbow member 30 for rotation about horizontally oriented axes 42 and 44 respectively. The first and second link arms 36 are arranged with respect to the support member 12 and elbow 30 in the form of a parallelogram linkage. The second elevator arm assembly 28 is a mirror image of the first arm 26 and includes a third link arm 46 and a fourth link arm 38 pivotably mounted at horizontal axes 50, 52, 54 and 56. A sprocket 58 is secured with respect to the distal end of the first link arm 34 for rotation about the axis 42 and a sprocket 60 is mounted at the proximal end of the third link arm 46 for rotation about the axis 50. The sprockets 50 and 60 mesh with one another and provide a one to one gear ratio.

The elevator drive mechanism 18 includes an elevator or extend/retract motor 62 which is drivingly connected to a harmonic reduction gear 64 which is in turn drivingly connected to a sprocket 66 which is fixed with respect to the proximal end of the elevator link arm 36 for rotation with the link arm 36 about the axis 40.

In use, when the extend/extract motor is activated for rotation in the direction required to effect raising of the elevator arm, the sprocket 66 is rotatably driven in the direction of the arrow 80. Rotation of the link arm 34 in the direction of the arrow A causes a corresponding rotation of the link arm 36 and the axis 38. By reason of the parallelogram nature of the linkage mechanism of the first elevator arm 26, the distal end of the first elevator arm 26 is elevated and thus the elbow member 30 is elevated. Rotation of the first link arm 34 in the direction of the arrow A causes the rotation of the arm 34 about the axis 42, the rotation about the axis 42 causes rotation of the sprocket 58 which in turn rotates the sprocket 60.

Rotation of the sprocket 60 causes rotation of the second arm 28 with respect to the first elbow member 30 such that the motion of the second arm 28 with respect to the elbow 30 is the mirror image of the motion of the first arm 26 with respect to the first elbow 30. This results from the fact that the first and second arms are identical to one another in length and the gear ratio of the meshing gears 60 is 1:1. Thus, the second end support member 32 may be raised or lowered on a perpendicular axis.

The horizontally oriented extensible arm assembly 16 has a first horizontal arm assembly 26a and a second horizontal arm assembly 28a connected by the second elbow 30a. The components of the arms 26a and 28a and elbow 30a are identical to those previously described with reference to the elevator arm 40 and are identified by like reference numerals with the suffix 'a' added. Again by reason of the fact that the first horizontal arm 26a and second horizontal arm 28a are a mirror image of one another with respect to the second elbow member 30a, when the extend/retract motor 24 is activated to drive the link arm 36a about its pivotal connection 40a with respect to the support 12a, the wrist member 25 is caused to move in a straight line toward or away from the support 12a.

In order to provide for adjustment of the direction in which the horizontal arm is extended, the support 12a is mounted on a housing 62 for rotation about axis 64. The support 12a has sprocket 66 secured thereto which meshes with sprocket 68 of the azimuth motor 22. By rotatably driving the azimuth motor 22, the direction in which the horizontal arm assembly 16 may be extended or retracted is adjusted.

Figure 4:
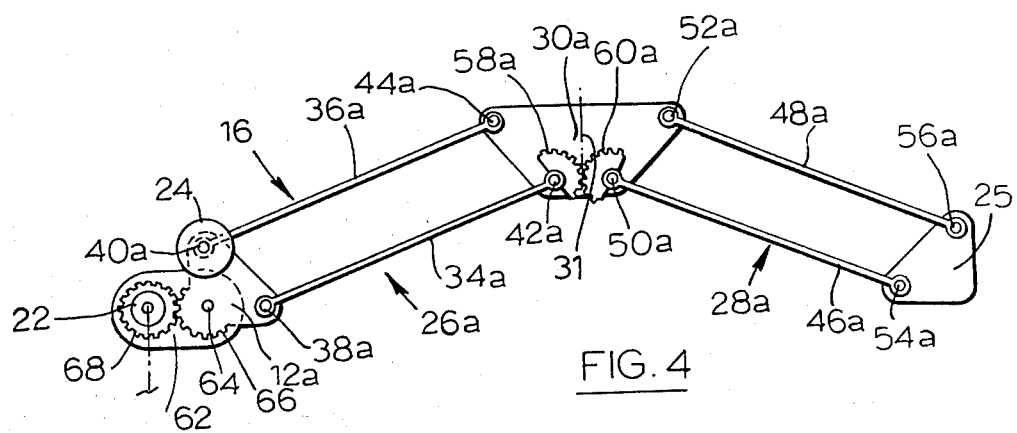
FIG. 4 is a diagrammatic plan view of a further manipulator arm which is mountable on the end of the arm of FIG. 3.

FIGS. 5 and 5a illustrate the structure of a typical manipulator arm assembly in more detail. Again, like reference numerals are applied to like parts to those appearing in FIGS. 3 and 4 of the drawings with the suffix 'b' being applied thereto. In this embodiment, the principal difference is the provision of arm housings 70 and 72. The arm housing 70 is pivotably connected to the support structure 12b on axis 74 which is located centrally between the axes 38b and 40b in the plane extending therebetween. Similarly, housing 70 is pivotably connected at axis 74 to the elbow members 30b centrally between axes 42b and 44a in the plane extending therebetween. The housing 72 is pivotably mounted for rotation about axes 78 and 80 which are located centrally between axes 50b and 52b and 54b and 56b respectively. The housing 70 has longitudinally extending channels 84 and 86 through which the link arms 34b and 36b extend respectively. The housing 74 has longitudinally extending channels 88 and 90 through which the link arms 46b and 48b extend respectively. In this instance, the sprocket members 58b and 60b are fixed with respect to the housing members 70 and 72 respectively for movement therewith about the axes 76 and 78 respectively relative to the elbow member 30b. Thus, it will be seen that by driving the first arm housing 70 relative to the support member 12b about the axis 74 by suitable drive means (not shown), this rotation can be translated into linear movement of the second support 32b in the direction of the arrow B. As shown in FIG. 4, the arm housing 70 and 72 may be moved to position in which they are axially aligned without effecting any change in the angular disposition of the second support member 32b with respect to the first support member 12b. This is achieved by reason of the fact that the two parallelogram linkage mechanisms are retained in phase with one another by the mesh of the gear quadrants 58b and 60b.

A further embodiment of the invention is illustrated in FIGS. 6 and 6a of the drawings. In FIG. 6a the first arm assembly 26c is identical to the arm assembly 26b of FIG. 5. The second arm assembly 28c differs from those previously described in that it does not include a parallelogram linkage mechanism. In this embodiment while the axis 80c will be extended and retract along the axis 92 in moving from the retracted position shown in FIG. 6 to the extended position shown in FIG. 6a, the outer support member 32c is angularly adjustable by reason of the fact that it is independently movable about the axis 80c. A further difference in the structure illustrated in FIGS. 6 and 6b is in the power transmission means for drivingly connecting the first arm 26c to the second arm 26b. In this embodiment the first arm 26c has an arcuate winding surface 96 at its distal end and the second arm 28c has an arcuate winding face 98 at its proximal end. A flexible band 94 is connected at its first end 100 to the arm 26c and at its second end 102 to the arm 28c. The arc of curvature of the winding faces 96 and 98 is generated from a centre of rotation located at the axes 76c and 78c respectively. Thus, as the arm housing 70c and its associated winding segment 58c are rotated about the axis 76c, the flexible band 96 is either wound onto or wound from the winding surface of the segment 58c to rotate the second arm 28c about the elbow 30c. It will be noted that electrical power lines may extend from one arm to the other, through the elbow joints by following the path of the flexible band, and may in fact be formed integrally therewith. Thus, electrical power lines may extend along the extensible arms without fear of damage resulting from the articulation of the arms.

In use, various manipulator tools including a manipulator wrist may be coupled to the interface member 25 as required.

The manipulator arm assembly described with reference to FIGS. 1 to 4 of the drawings is particularly suitable for use as an aid to invalids as it may be conveniently mounted on a wheelchair. The provision of an elevator arm assembly in combination with a horizontally oriented arm assembly provides a substantial reach and a high degree of manoeuvrability which enables the invalid to direct the arm around obstacles and in a confined space.

It will also be apparent that the first and second arm assemblies 14 and 16 may be used independently of one another in a variety of different manipulator assemblies. Thus, the arm assembly 14 may form the complete mechanism of a manipulator or it may be used in combination with one or additional assemblies connected in series.

In use, merely by activating the drive mechanism which alters the configuration of the parallelogram link arms the various arms are caused to extend and retract in a manner such that the distal end of the outer arm is caused to move in a straight line with respect to the proximal end of the inner arm.

Figure 1:
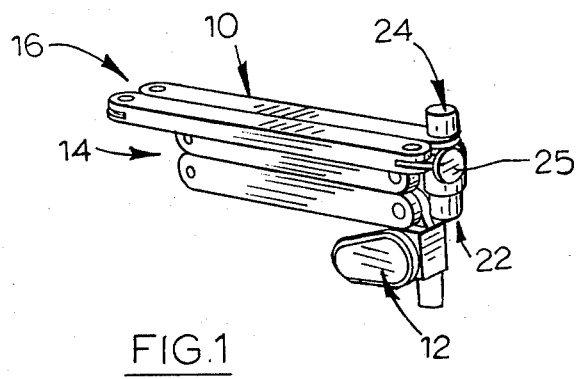

Thus, it will be seen that the operator may operate the arm assembly of FIG. 1 to initially extend the elevator arm assembly to locate the horizontal arm at the elevation of the target and thereafter may adjust the angular position of the extend/retract arm with respect to the elevator arm by activating the azimuth drive and thereafter extend the horizontal arm by activating the extend/retract drive motor. By the independent operation of these three drive mechanisms the manipulator tool interface can be located fairly closely adjacent the target and fine adjustments of elevations azimuth and extend/retract can be made when the operator tool is closely adjacent the target. It will be noted that by activating the elevator mechanism, only the height of the distal end of the horizontal arm is adjusted and similarly by activating the azimuth drive, only the azimuthal position of the arm is adjusted and by activating the extend/retract mechanism, only the distance of the distal end of the horizontal arm with respect to its inner end is adjusted. Thus, by providing three independently controllable degrees of freedom, the control of the manipulator tool is greatly simplified. These and other advantages of the apparatus of the present invention will be apparent to those skilled in the art.

Various modifications of the structure of the present invention will be apparent to those skilled in the art without departing from the scope of the invention. One such modification is illustrated in FIG. 4 of the drawings wherein the broken line 31 indicates a plane along which the second elbow member 16 may be interrupted so that the second elbow member 30a is in the form of two identical sections resembling the interface member 25. By this simple expedient the arm assemblies can be made modular so that additional arm assemblies can be connected in series to increase the extension capability of the manipulator. In order to make such an extension it will, of course, be apparent that additional gear segments such as that illustrated at 60a must be provided at the distal end of 56a of the link arm 48a.

What we claim as our invention is:

1. A manipulator comprising;
   (a) a first arm having a proximal end and a distal end,
   (b) a second arm having a proximal end and a distal end,
   (c) an elbow member disposed between the distal end of said first arm and the proximal end of said second arm,
   (d) said first arm comprising;
      (i) a first end support member at the proximal end thereof,
      (ii) a first pair of linkage members of equal length, said first pair of linkage members consisting of a first and second link arm each having a proximal end pivotally mounted on said first end support and a distal end pivotally mounted on said elbow member, said first and second link arms extending parallel to one another and cooperating with said first support end and said elbow member to form a first movable parallelogram linkage assembly,
   (e) said second arm comprising;
      (i) a second end support member at the distal end thereof,
      (ii) a second pair of linkage member of equal length and of a length equal to that of said first pair of linkage members, said second pair of linkage members consisting of third and fourth link arms each having a proximal end pivotally mounted on said elbow member and a distal end pivotally mounted on said second end support member, said third and fourth link arms extending parallel to one another and cooperating with said elbow member and second end support member to form a second movable parallelogram linkage assembly which is of equal proportion to and a mirror image of said first parallelogram linkage assembly,
   (f) power transmission means drivingly interconnecting said first arm and said second arm at said elbow member whereby angular movement of said first arm relative to said elbow causes identical angular movement of said second arm relative to said elbow thereby causing the distal end of said second arm to move in a straight line path relative to said proximal end of said first arm as said remote manipulator is extended and retracted,
   (g) drive means at one end of one of said link arms operable to change the geometry of its associated parallelogram linkage assembly to thereby effect extension or retraction of the distal end of the second arm with respect to the proximal end of the first arm.

2. A manipulator as claimed in claim 1 wherein said pivotal connections of the distal ends of said first and second link members lie in a first plane and the pivotal connections of the proximal ends of said third and fourth link arms lie in a second plane at said elbow member, said first and second planes being angularly spaced from one another to permit said distal end of said second arm to be located closely adjacent said proximal end of said first arm when said manipulator is in a retracted configuration and to permit said first and second arms to be substantially axially aligned when in a fully extended configuration, thereby to provide a maximum extended height and a minimum retracted height to the arm in use.

3. A manipulator as claimed in claim 2 wherein the angle between said first and second planes is about 90° whereby said first and second arms extend parallel to one another when said manipulator is in its retracted configuration.

4. A manipulator as claimed in claim 1 wherein the distal end of said second link member is disposed adjacent the proximal end of said third link member at said elbow and said power transmission means comprises means interconnecting the distal end of said first link member and the proximal end of said third link member whereby rotation of said second link arm relative to said elbow member causes a corresponding rotation of said third link arm relative to said elbow member such that the configuration of the parallelogram linkage of the second arm remains as a mirror image of the parallelogram configuration of the first arm.

5. A manipulator as claimed in claim 4 wherein said means interconnecting said distal end of said second link arm and said proximal end of said third link arm includes a first sprocket mounted at said distal end of said first link arm for rotation about its pivotal connection with said elbow and a second sprocket mounted at the proximal end of said third link arm for rotation about its pivotal connection with said elbow, said first and second sprockets having a one-to-one gear ratio to provide uniform angular displacement of the first and second arms with respect to said elbow.

6. A manipulator as claimed in claim 1 wherein said power transmission means comprises a flexible band coupler having one winding face on the distal end of said first arm and a second winding face on the proximal end of said second arm and a flexible band extending around and between said first and second winding faces, said first winding face having an arc of curvature generated from a centre of rotation located centrally between the axis of rotation of said first and second link arms at the distal end thereof and second winding face having an arc of curvature generated from a centre of rotation located centrally between the axes of rotation of said third and fourth link arms at the proximal ends thereof.

7. A manipulator as claimed in claim 1 wherein said drive means is located at said proximal end of said first arm for rotatably driving one of said link arms about its pivotal connection with said first support member.

8. A manipulator as claimed in claim 1 including a support structure for supporting said proximal end of said first arm, said first end support member of said first arm being pivotably mounted on said support structure for movement about an azimuth axis and azimuth drive means drivingly connecting said support structure and said first end support member for movement of said first arm relative to said support structure without extending or retracting said first arm.

9. A manipulator as claimed in claim 2 wherein said elbow member is a composite member having a release interface extending in a plane which bisects the included angle between said first and second planes.

10. A manipulator comprising;
   (a) a first support structure,
   (b) a first extensible unit comprising;
      (i) a first arm having a proximal end and a distal end,
      (ii) a second arm having a proximal end and a distal end, (iii) a first elbow member disposed between the distal end of said first arm and the proximal end of said second arm, (iv) said first arm comprising, first and second link arms of equal length, said first and second link arms each having a proximal end pivotably mounted on said first support structure and a distal end pivotably mounted on said first elbow, said first and second link arms extending parallel to one another and cooperating with said first support structure and said first elbow to form a first moving parallelogram linkage assembly, (v) said second arm comprising, a second end support member at the distal end thereof, third and fourth link arms of equal length, said third and fourth link arms each having a proximal end pivotably mounted on said first elbow and a distal end pivotably mounted on said second end support member, said third and fourth arms extending parallel to one another and cooperating with said first elbow member and said second end support member to form a second movable parallelogram linkage assembly, (c) power transmission means drivingly interconnecting said first arm and said second arm at said first elbow member whereby angular movement of said first arm relative to said first elbow causes identical angular movement of said second arm relative to said first elbow member, (d) first drive means drivingly connected to a selected one of said first and second parallelogram linkage assemblies for effecting angular movement of a selected one of said link arms about its pivotal connection thereby to effect angular movement of said selected linkage assembly and thereby extend and retract said first arm assembly to move the distal end of the second arm in a straight line path relative to the proximal end of the first arm in response to activation of said first drive means, (e) a second extensible unit comprising;
(i) a third arm having a proximal end and a distal end,
(ii) a fourth arm having a proximal end and a distal end,
(iii) a second elbow member disposed between the distal end of said third arm and the proximal end of said fourth arm,
(iv) said third arm comprising fifth and sixth link arms of equal length, said fifth and sixth link arms each having a proximal end pivotally mounted on said second support end structure and a distal end pivotally mounted on said second elbow, said fifth and sixth link arms extending parallel to one another and cooperating with said second support structure and said second elbow to form a third movable parallelogram linkage assembly;
(v) said fourth arm comprising a third end support member at the distal end thereof, seventh and eighth link arms of equal length, said seventh and eighth link arms each having a proximal end pivotally mounted on said second elbow and a distal end pivotally mounted on said third end support member, said seventh and eighth link arms extending parallel to one another and cooperating with said second elbow member and said third end support member to form a fourth movable parallelogram linkage assembly, (f) second power transmission means drivingly interconnecting said third arm and said fourth arm at said second elbow member whereby angular movement of said third arm relative to said second elbow member causes identical angular movement of said fourth arm relative to said second elbow member, (g) extend/retract drive means drivingly connected to a selected one of said third and fourth linkage assemblies for effecting angular movement of one of its link arms about its pivotal connection thereby to effect angular movement of said selected linkage assembly which translates through the fourth and fifth parallelogram linkage assemblies and the second power transmission means into extension or retraction of said assembly.

11. A manipulator as claimed in claim 10 wherein said second extensible unit is mounted with respect to said first extensible unit to extend in a plane which is perpendicular to the plane in which said first extensible unit extends.

12. A manipulator comprising;
(a) a first support structure mountable on a wheelchair,
(b) a vertically oriented arm assembly comprising,
(i) a first elevator arm having a proximal end and a distal end, the proximal end being pivotably mounted on said first support structure for rotation about a horizontally oriented first axis,
(ii) a first elbow member pivotably mounted at said distal end of said first arm for rotation about a horizontally oriented second axis,
(iii) a second elevator arm having a proximal end and a distal end, the proximal end being pivotably mounted on said first elbow member for rotation about a horizontally oriented third axis,
(iv) a second support member pivotably mounted at the distal end of said second arm for rotation about a horizontally oriented third axis,
(v) first power transmission means serially connecting said first support structure, said first support arm, said first elevator arm, said first elbow member, said second elevator arm and said second support member whereby upon rotation of said first arm about said first horizontal axis said second support member is caused to move perpendicularly away from said first support member,
(vi) first elevator drive means engaging said first power transmission means for driving said first transmission means to effect vertical movement of said vertically oriented arm assembly,
(c) a horizontally oriented extend/retract assembly comprising,
(i) a third arm having a proximal end and a distal end, the proximal end being mounted on said second support member for rotation about a vertically oriented fifth axis,
(ii) a second elbow member pivotally mounted at said distal end of said third arm for rotation about a vertically oriented sixth axis,
(iii) a fourth arm having a proximal end and a distal end, the proximal end being pivotally mounted on said second elbow member for rotation about a vertically oriented seventh axis,
(iv) a third support member pivotally mounted at the distal end of said fourth arm for rotation about a vertically oriented eighth axis, (v) second power transmission means serially connecting said third arm, said second elbow, said fourth arm and said third support structure whereby upon rotation of said third arm about said fifth axis said fourth arm is caused to move away from said third arm, (vi) extend/retract drive means engaging said second power transmission means for driving said second power transmission means to effect extension and retraction of said horizontally oriented arm assembly.

13. A manipulator comprising;
(a) a first support structure,
(b) a first extensible unit comprising;
  (i) a first arm having a proximal end and a distal end,
  (ii) a second arm having a proximal end and a distal end,
  (iii) a first elbow member disposed between the distal end of said first arm and the proximal end of said second arm,
  (iv) said first arm comprising, first and second link arms of equal length, said first and second link arms each having a proximal end pivotably mounted on said first support structure and a distal end pivotably mounted on said first elbow, said first and second link arms extending parallel to one another and cooperating with said first support structure and said first elbow to form a first moving parallelogram linkage assembly.
  (v) said second arm comprising, a second end support member at the distal end thereof, third and fourth link arms of equal length and of a length equal to that of said first pair of linkage members, said third and fourth link arms each having a proximal end pivotably mounted on said first elbow and a distal end pivotably mounted on said second end support member, said third and fourth arms extending parallel to one another and cooperating with said first elbow member and said second end support member to form a second movable parallelogram linkage assembly, which is of equal proportion to and has a configuration which is a mirror image of said first parallelogram linkage assembly,
(c) power transmission means drivingly interconnecting said first arm and said second arm at said first elbow member whereby angular movement of said first arm relative to said first elbow causes identical angular movement of said second arm relative to said first elbow member,
(d) first drive means drivingly connected to a selected one of said first and second parallelogram linkage assemblies for effecting angular movement of a selected one of said link arms about its pivotal connection thereby to effect angular movement of said selected linkage assembly and thereby extend and retract said first arm assembly to move the distal end of the second arm in a straight line path relative to the proximal end of the first arm in response to activation of said first drive means,
(e) a second extensible unit comprising;
  (i) a third arm having a proximal end and a distal end,
  (ii) a fourth arm having a proximal end and a distal end,
  (iii) a second elbow member disposed between the distal end of said third arm and the proximal end of said fourth arm,
  (iv) said third arm comprising fifth and sixth link arms of equal length, said fifth and sixth link arms each having a proximal end pivotally mounted on said second support end structure and a distal end pivotally mounted on said second elbow, said fifth and sixth link arms extending parallel to one another and cooperating with said second support structure and said second elbow to form a third movable parallelogram linkage assembly;
  (v) said fourth arm comprising a third end support member at the distal end thereof, seventh and eighth link arms of equal length and of a length equal to that of said first pair of linkage members, said seventh and eighth link arms each having a proximal end pivotally mounted on said second elbow and a distal end pivotally mounted on said third end support member, said seventh and eighth link arms extending parallel to one another and cooperating with said second elbow member and said third end support member to form a fourth movable parallelogram linkage assembly which is of equal proportion to and has a configuration which is a mirror image of said third parallelogram linkage assembly,
(f) second power transmission means drivingly interconnecting said third arm and said fourth arm at said second elbow member whereby angular movement of said third arm relative to said second elbow member causes identical angular movement of said fourth arm relative to said second elbow member,
(g) extend/retract drive means drivingly connected to a selected one of said third and fourth linkage assemblies for effecting angular movement of one of its link arms about its pivotal connection thereby to effect angular movement of said selected linkage assembly which translates through the fourth and fifth parallelogram linkage assemblies and the second power transmission means into extension or retraction of said assembly.

14. A manipulator as claimed in claim 13 wherein said second extensible unit is mounted with respect to said first extensible unit to extend in a plane which is perpendicular to the plane in which said first extensible unit extends.

15. A manipulator comprising;
(a) a first arm having a proximal end and a distal end,
(b) a second arm having a proximal end and a distal end,
(c) an elbow member disposed between the distal end of said first arm and the proximal end of said second arm,
(d) said first arm comprising;
  (i) a first end support member at the proximal end thereof,
  (ii) a first pair of linkage members of equal length, said first pair of linkage members consisting of a first and second link arm each having a proximal end pivotally mounted on said first end support and a distal end pivotally mounted on said elbow member, said first and second link arms extending parallel to one another and cooperating with said first support end and said elbow member to form a first movable parallelogram linkage assembly, (e) said second arm comprising;
  (i) a second end support member at the distal end thereof,
  (ii) a second pair of linkage members of equal length, said second pair of linkage members consisting of third and fourth link arms each having a proximal end pivotally mounted on said elbow member and a distal end pivotally mounted on said second end support member, said third and fourth link arms extending parallel to one another and cooperating with said elbow member and said second end support member to form a second movable parallelogram linkage assembly,
(f) power transmission means drivingly interconnecting said first arm and said second arm at said elbow member whereby angular movement of said first arm relative to said elbow causes identical angular movement of said second arm relative to said elbow thereby causing the distal end of said second arm to move in a straight line path relative to said proximal end of said first arm as said remote manipulator is extended and retracted, said power transmission means comprising a flexible band coupler having one winding face on the distal end of said first arm and a second winding face on the proximal end of said second arm and a flexible band extending around and between said first and second winding faces, said first winding face having an ard of curvature generated from a centre of rotation located centrally between the axis of rotation of said first and second link arms at the distal end thereof and second winding face having an arc of curvature generated from a centre of rotation located centrally between the axes of rotation of said third and fourth link arms at the proximal ends thereof,
(g) means for activating said power transmission means to extend and retract said arm.

* * * * *